April 7, 1970     M. I. BAKUNIN ET AL     3,504,665
MEDICAL GYNECOLOGIC OSCILLATOR Filed July 10, 1967     2 Sheets-Sheet 2

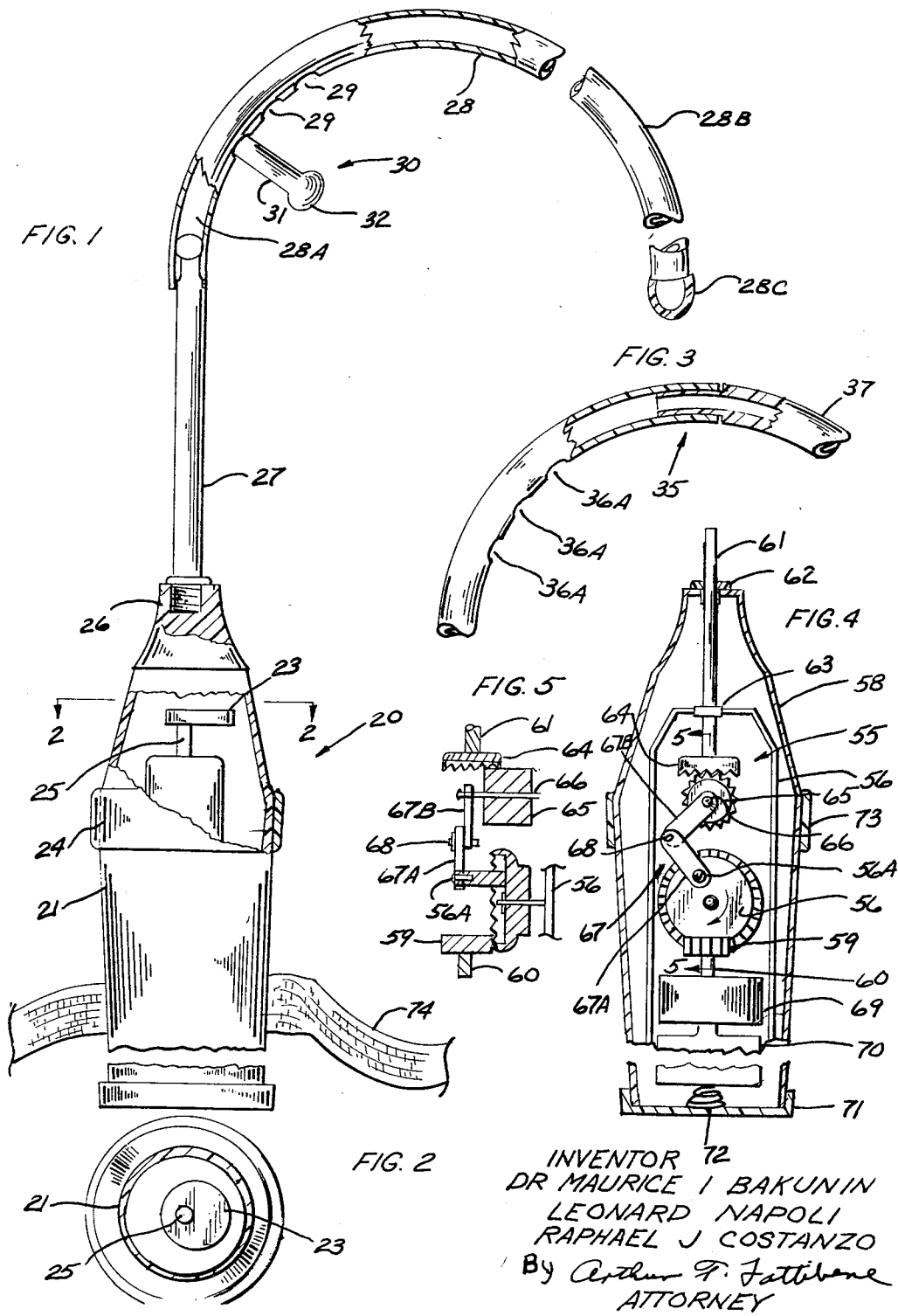

INVENTOR
DR. MAURICE I BAKUNIN
LEONARD NAPOLI
RAPHAEL J COSTANZO

By Arthur F. Fattibene
ATTORNEY

United States Patent Office 3,504,665
Patented Apr. 7, 1970

3,504,665
MEDICAL GYNECOLOGICAL OSCILLATOR
Maurice I. Bakunin, 881 Lafayette St., Bridgeport, Conn. 06604; Leonard Napoli, 60 Rosebrook Drive, Stratford, Conn. 06075; and Raphael J. Costanzo, 119 Park St., Bridgeport, Conn. 06604
Filed July 10, 1967, Ser. No. 652,351
Int. Cl. A61h *19/00*
U.S. Cl. 128—36
17 Claims

ABSTRACT OF THE DISCLOSURE

This invention is directed to a medical gynecologic oscillator adapted to function as a limited aid for stimulating the erotic clitoral, vaginal and/or labial areas, to obviate frigidity, vaginismus and other related causes of sexual deficiency and/or sexual incompatibility. The medical gynecologic oscillator comprises an instrument which includes a housing containing an oscillator and a source of electrical power for energizing the oscillator. A projection extends outwardly from the housing to which there is connected an exciting means for stimulating the erotic areas when actuated. The exciting means is shaped to include a first portion and a second portion, the latter being adapted to be readily inserted into the vagina to engage the erotic areas thereof. The first portion has connected thereto an appendage shaped to excite the clitoris when the instrument is placed in operation. Variously shaped appendages are provided depending upon the anatomic variations and requirements of particular patients.

BACKGROUND OF THE INVENTION

Heretofore many married couples for various reasons have failed to achieve lasting compatibility essential to preserving the marital state. Medical experience has shown that the greatest causes of incompatibility between married couples can be traced directly to sexual deficiency and/or sexual incompatibility. Failure of sexual compatibility has been medically attributed to several prominent causes, which include female frigidity, vaginismus, anatomic variations and/or physical malformities in one or both partners. Incidental to the failure of achieving sexual compatibility and/or the desire for sexual relationship between married couples is the lack of procreation, which is frequently desirable by couples confronted with the problem of sexual deficiency and/or incompatibility. For this reason complete fulfillment, happiness, and/or satisfaction in life is seldom achieved by such couples.

OBJECTS OF THE INVENTION

It is therefore an object of this invention to provide a limited medical aid which can stimulate the erotic areas of the clitoris, vagina and labia to induce conditioned reflexes which tend to minimize fear of coitus, obviate vaginismus and increase the sexual desire where deficient.

Another object of this invention is to provide a medical gynecologic oscillator which is adapted to form a limited aid for simultaneously exciting the erotic areas of the clitoris and vagina preliminary to actual coitus.

Another object of this invention is to provide a medical gynecologic oscillator constructed to stimulate either the erotic areas of the clitoris and/or the vagina simultaneously and/or independently depending upon the particular diagnosed problem.

Still another object is to provide a medical gynecologic oscillator which can be adjusted to complement the anatomical structure of particular patients.

Another object is to provide a gynecologic oscillator which is relatively simple in structure, which is simple to use, and which is positive in operation.

Another object is to provide a medical aid which in limited application will function to increase the sexual desire and/or appetite of particular patients necessary to attain the desired marital happiness and unity.

Another object is to provide a medical device in the form of a gynecologic oscillator as an aid to achieving mutual sexual satisfaction of married couples.

The foregoing objects and other features and advantages are attained by a medical gynecologic oscillator adapted for use as a limited aid to stimulate the erotic clitoral and vaginal areas comprising a housing for encasing a motor means, a battery source of electrical power connected in circuit with the motor means, and an oscillator actuated by the motor when energized. Means in the form of a projection extend outwardly of the housing. An exciting means is operatively connected to the projection and it is shaped so that the free end thereof is readily insertable into the vagina to engage the erotic areas thereof. An appendage is adjustably disposed along a portion of the exciting means so as to be disposed adjacent the clitoris when the medical aid is placed in operation. With the medical aid properly positioned on the anatomy of the patient and the motor switch closed, the exciting means and appendage carried thereon are soothingly oscillated to excite the erotic areas coming into contact with the exciting means in preparation for the coitus.

A feature of this invention resides in the provision of a gynecologic oscillator which is constructed and arranged to excite the erotic areas of the clitoris and vaginal areas, either simultaneously and/or independently.

Another feature of this invention resides in the provision of a self-contained gynecologic oscillator that is extremely safe in operation, easy to use, and which is capable of inducing conditioned reflexes conducive to fulfilling sexual satisfaction between otherwise sexually deficient couples.

Another feature of this invention is to provide a medical gynecologic oscillator having exciting means which can be adjusted to complement the anatomic structure of a given patient.

Another feature of this invention resides in the provision of a gynecologic oscillator having an exciting means including a plurality of variously constructed appendages which can be adjustably disposed along the length of the excitor means for accommodating anatomic variations in the site of the clitoris in relationship to the vaginal orifice.

Other features and advantages will become more readily apparent when considered in view of the specification and drawings in which:

FIG. 1 is a front elevation view of the gynecologic oscillator of this invention.

FIG. 2 is a plan view taken along line 2—2 on FIG. 1.

FIG. 3 is a fragmentary portion of a modified construction.

FIG. 4 is a sectional view of a modified construction.

FIG. 5 is a sectional view taken along line 5—5 on FIG. 4.

Figure 7:
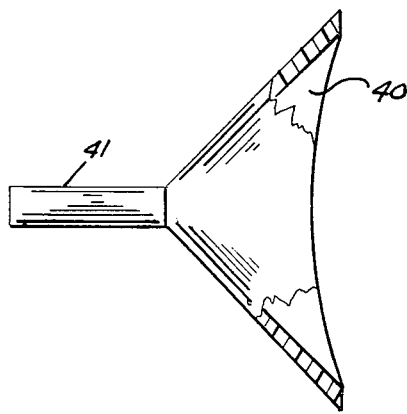
FIG. 7 is a side view of the appendage of FIG. 6 having portions thereof shown in section.

Referring to the drawings there is shown in FIG. 1, a medical gynecologic oscillator 20 which comprises a housing 21 for encasing a motor means 22 and vibrating means 23 energized by the motor means and a source of electrical energy such as a battery connected in electrical circuit with the motor means 22. A switch means in the form of a ring 24 is rotatably journalled on the body in a manner such that when the ring 24 is rotated in one direction a circuit between the motor means 22 and the battery source is closed, and when rotated in the opposite direction the circuit to the motor means 22 is opened. However, it will be understood that any other suitable switching means may be employed for making and breaking the circuit to the motor means. The circuit thus described comprises a simple series circuit in which the battery is connected in series with the motor means 22 with the switch 24 disposed in series between the battery and the motor means.

In the form of the invention defined in FIG. 1, the oscillator 23 comprises a weighted flywheel which is eccentrically mounted to the motor spindle 25. Accordingly, it will be noted that when the motor 22 is actuated, the weighted flywheel 23 journalled to the spindle 25 is rotated at high speeds. Due to the unbalance as a result of its eccentric connection, an oscillating motion is imparted to the instrument.

Connected in a socket 26 formed in one end of the housing 21 is a projection 27 which extends outwardly therefrom. Preferably the projection 27 is formed of a suitable material which is free to flex as the eccentric flywheel 23 is placed in rotation, so that the oscillatory motion produced by the unbalanced flywheel imparts an oscillatory motion to the projection 27.

An exciting means 28 is extended from the end of the projection 27. In the form of the invention shown in FIG. 1 the excitor 28 comprises a tubular member having a first portion 28A extending beyond the end of the projection and a second portion 28B curved in a manner so that the end portion 28C thereof may be readily inserted into the vagina of the wife patient. The end of the excitor 28 is preferably formed of a non-toxic resilient material such as any of the suitable plastics or rubber. Also the end of the excitor is shaped to engage with the erotic areas of the vagina.

Referring to the form of the invention of FIG. 1, the first portion 28A of the excitor 28 is provided with a plurality of spaced sockets or holes 29 adapted to receive an appendage 30 which constitutes a component part of the gynecologic oscillator 20. As shown in FIG. 1, the appendage 30 comprises a stem portion 31 by which it is detachably secured in one of the holes or sockets 29. Connected to the free end of the stem 31 is a knob or head 32 of resilient material which is adapted to excite the clitoris when the oscillator 20 is placed in operation. In order to accommodate for any anatomic variation in the site of the clitoris in relationship to the vaginal orifice, the appendage 30 can be adjusted along the length of the excitor 28 by insertion of its stem 31 into the appropriate hole or socket 29.

To place the gynecologic oscillator 20 in operation, the free end 28C of the excitor 28 is inserted into the vagina so that the appendage 30, properly adjusted along the length thereof, is positioned opposite the clitoris. With the oscillator properly positioned, the motor switch 24 is actuated. The ocillatory movement thus generated by the oscillator means is transmitted to the end of the excitor and the appendage connected thereto to simultaneously excite the erotic areas of both the vagina and the clitoris. In the event it is only necessary to excite the erotic areas of the vagina, the gynecologic oscillator may be used without the appendage attachment 30. When the wife or patient has been sufficiently stimulated, full satisfaction of actual coitus may be had.

FIG. 3 illustrates a modified form of excitor. In this embodiment the excitor 35 comprises a two-piece construction including a first portion 36 which is detachably connected to the projection 27 of the oscillator and a section portion 37 detachably connected to the first portion 36. As previously described the first portion 36 has a plurality of holes or sockets 36A for receiving the clitoris appendage 30. The second portion 37 as hereinbefore described is shaped and sized to be received in the vagina. With this form of the invention it will be noted that the gynecologic oscillator 20 may be used with the first portion 36 and its clitoris attachment only wherein it is desirable to stimulate the clitoris only. Alternatively the clitoris attachement may be used in combination with the second portion 37 so that the erotic areas of both the clitoris and the vagina may be simultaneously excited. Or the clitoris appendage 31 may be removed and the oscillator used as a stimulator of the vaginal erotic areas only.

Figure 6:
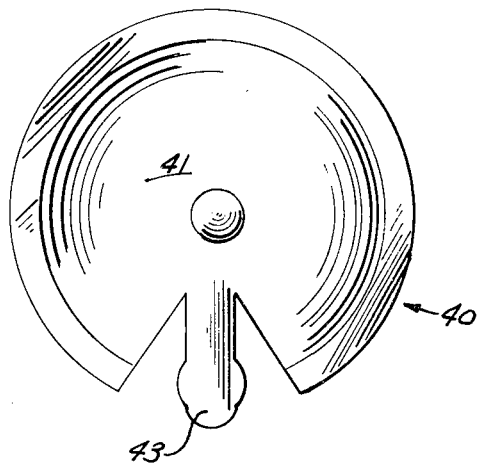
FIG. 6 is a front view of an appendage drawn to an enlarged scale for use on the excitor of FIGS. 1 and 3.

FIGS. 7 and 6 illustrate a modified clitoris appendage 40. In this embodiment the clitoris appendage 40 comprises a cone-shaped cup member 41 having outwardly flaring surfaces and a stem 42 extending outwardly from the apex portion thereof. As best seen in FIG. 6, segmental portions of the cone are blanked out to define a flexible feeler or finger 42. It will be understood that the appendage of FIGS. 6 and 7 may be substituted for the appendage 30 of FIG. 1. Accordingly, the appendage 40 of FIGS. 6 and 7 is readily attached to the excitor of FIG. 1 or 2 by frictionally securing the stem 42 thereof into the appropriate socket or hole 29 or 36A. It will be understood that the appendage 40 of FIGS. 6 and 7 is preferably formed of a non-toxic plastic or rubber which has sufficiently flexibility for exciting the clitoris when the oscillatory motion imparted to the projection 27 and connected excitor 28 or 35 is transmitted to the appendage mounted thereon.

Figure 9:
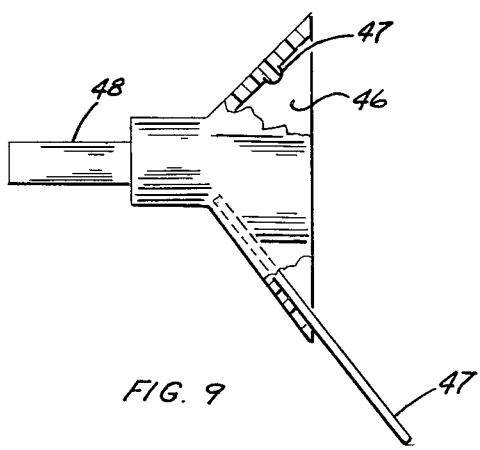
FIG. 9 is an enlarged side view of the appendage of FIG. 8 having portions thereof shown in section.
Figure 8:
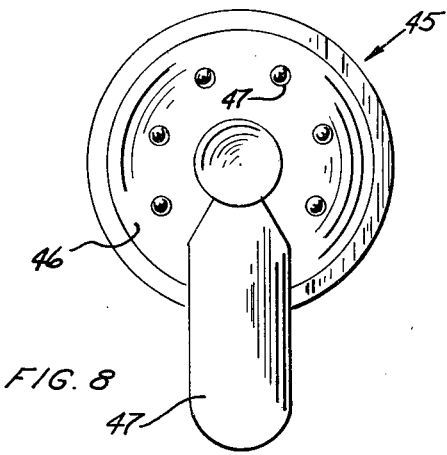
FIG. 8 is an enlarged front view of a modified appendage.

FIGS. 8 and 9 illustrate a further embodiment of clitoris appendage. In this form the appendage 45 comprises a conical cup-shaped member 46 having a plurality of internal protuberances 47 circumferentially spaced about the interior of the cup. Connected to the interior surface of the cone-shaped cup 46 is a flexible finger 47 which extends outwardly therefrom; and a stem 48 is connected to the apex portion thereof whereby the appendage 45 is readily connected to an appropriate socket 29 or 36A in the excitor 28 or 35. In operation the appendage 45 of FIGS. 8 and 9 is similar to that of FIGS. 6 and 7 with the exception that the sensitivity of the finger 47 is enhanced due to its extended length.

Figure 10:
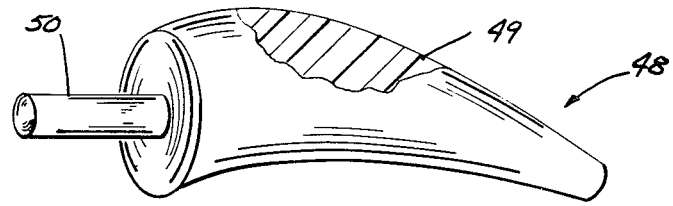
FIG. 10 is an enlarged perspective view of another modified appendange.

FIG. 10 illustrates another modified appendage construction. In this embodiment the appendage 48 comprises a horn-shaped structure 49 formed of suitable rubber or plastic and a connected stem 50 by which it may be adjustably secured in the appropriate socket or hole 29 or 36A.

FIGS. 4 and 5 illustrate a modified oscillating mechanism 55 by which an oscillatory motion is imparted to the excitor and appendage adapted to be carried thereon. In this form of the invention a driven gear 56 is rotatably journalled on a suitable frame 57 carried within the housing 58. A spur gear 59 mounted on the end of the motor spindle 60 is disposed in meshing relationship to the driven gear 56.

The projection 61 extending outwardly of the housing is rotatably journalled in suitable bearing 62, 63 mounted on the end of the housing 58 and frame 56. Connected to the lower end of the projection 61 is a gear disposed 64 in meshing relationship to a gear 65 journalled about pin 66.

A linkage means 67 is interconnected between gear 56 and gear 65 whereby the angular rotation of gear 56 is transformed to an oscillating movement to projection 61 and the gear 64 carried thereby. This is attained by a linkage connection 67 which includes a first link 67A which has one end thereof pivotly connected to gear 56 about a pin 56A which is eccentrically disposed with respect to the axis of rotation of gear 56.

The second link 67B has one end secured to the gear 65 and its other end articulated to the free end of the first link 67A about pivot pin 68. Thus, it will be noted that clockwise rotation imparted to gear 56 causes the first link 67A of linkage 67 to rotate in a manner which imparts an oscillating movement to gears 64 and 65 and the connected projection 61 whereby the latter is oscillated with sufficient frequency to effect sufficient oscillation of the excitor means 28 or 35 adapted to be connected to the end of projection 61 as hereinbefore described.

As shown in FIG. 4, the motor means 69 is suitably connected in electric circuit to the battery means 70 carried within the housing. If desired, the end of the housing 58 may be closed by an end cap 71 suitably secured to the end of the housing 58. Mounted on the end cap 71 is a spring means 71 which urges the battery means into electrical contact. A switch means 73 as hereinbefore described is interposed in the motor circuit for controlling the current flow thereto.

If desired a belt or strap 74 may be provided to secure the instrument to the patient's body.

While the illustrated drawings disclose particular means for imparting an oscillatory motion to the excitor means connected to the end of the housing, it will be understood that other forms of oscillating means may be employed, e.g. transducers and the like.

The medical gynecologic oscillator herein described can be suitably powered by flashlight-type dry cell battery thereby providing a wholly self-contained unit that is safe and easy to use. If desired a variable speed motor and controls therefor may be incorporated into the instrument in the event it is desirable to vary frequency of oscillation which may be necessitated in accordance with the needs of particular patients.

While the instant invention has been described with reference to particular embodiments thereof, it will be readily understood and appreciated that variations and modifications may be made without departing from the spirit or scope of the invention.

What is claimed is:
1. A gynecologic oscillator comprising:
   a housing,
   a projection extending outwardly from one end of said housing,
   exciting means connected to said projection for engaging an erotic area of a female vagina,
   and means disposed within said housing for imparting an oscillatory motion to said projection and exciting means connected thereto for stimulating said erotic area in engagement with said exciting means,
   said exciting means includes an appendage connected intermediate the ends thereof,
   said appendage being positioned so that in operation it is disposed adjacent the clitoris.
2. The gynecologic oscillator as defined in claim 3 wherein said exciting means includes a curved portion, the free end of which is readily insertable into a vagina to engage an erotic area of the vagina.
3. The invention as defined in claim 1 and including means of adjustably connecting said appendage at variable spaced locations along said exciting means.
4. The invention as defined in claim 3 wherein:
   said adjusting means include a plurality of sockets formed in said exciting means,
   said sockets being disposed in spaced alignment along an intermediate portion of said exciting means,
   and said appendage having a stem portion adapted to be frictionally secured in one of said sockets.
5. The invention as defined in claim 1 wherein:
   said appendage includes a cup-shaped member formed of a resilient material,
   a stem portion connected to the bottom of said cup, said stem portion extending outwardly therefrom,
   and means detachably connecting said stem portion to said exciting means.
6. The invention as defined in claim 1 wherein said oscillating means includes:
   an electric motor mounted within said housing,
   an oscillating means actuated by said motor,
   and a power source operatively connected in circuit with said motor.
7. The invention as defined in claim 6 wherein said power source comprises a low-voltage battery carried within said housing.
8. The invention as defined in claim 1 wherein:
   said appendage comprises a conically shaped cup member, said member flaring outwardly toward the open end thereof,
   a stem portion extending outwardly from the apex of said conically shaped cup member,
   said stem portion connecting said cup member to said exciting means.
9. The invention as defined in claim 8 wherein said cup member has its surface formed to define a flexible finger which is free to oscillate when said gynecologic oscillator is placed in operation.
10. The invention as defined in claim 9 wherein said cup-shaped member includes a plurality of protuberances circumferentially spaced about the internal surface of said cup-shaped member intermediate the ends of said cup-shaped member.
11. The invention as defined in claim 1 wherein said appendage comprises:
    a frusto-conical cup-shaped member having a stem portion extending outwardly from the apex portion thereof,
    and a resilient feeler connected to a surface portion of said cup-shaped member, said feeler extending beyond the flared lip of said cup-shaped member.
12. The invention as defined in claim 1 wherein said appendage comprises a flexible horn.
13. A gynecologic oscillator comprising:
    a housing having opposed end portions and a circumscribing wall portion connected between said ends,
    means defining a socket in one end of said housing,
    a projecting stem detachably connected to said rocket formed in the end of said housing,
    oscillating means disposed in said housing for transmitting an oscillatory motion to said projecting stem,
    exciting means connected to the free end of said projecting stem,
    said exciting means including a curved tubular member having a free end portion shaped for insertion into a vagina,
    said exciting means being formed of a resilient, nontoxic material, and said exciting means forming an extension of said projecting stem.
    said exciting means including a first portion and a second portion,
    said first portion having a series of adjusting sockets disposed in spaced alignment along a portion of the length thereof,
    and said second portion being adapted for insertion into a vagina,
    an appendage adjustably connected to said first portion in one of said adjusting sockets,
    said appendage being disposed adjacent the clitoris in the operative position,
    oscillating means disposed in said housing for transmitting an oscillatory action to said projecting stem and connected exciting means,
    said oscillating means including an electric motor,
    a battery source of electrical energy connected in circuit with a motor,
    and switch means connected in circuit with said motor means and said battery source,
    and an oscillator operatively connected to said motor means.
14. The invention as defined in claim 13 wherein said oscillator comprises an eccentric flywheel connected to the motor shaft.

15. The invention as defined in claim 1 wherein said projection is rotatably journalled in the end of said housing and said oscillating means includes:
 a driven gear rotatably journalled on said housing,
 a spur gear connected to said motor shaft disposed in meshing relationship with said gear,
 a gear connected to the end of said projection,
 and an interconnecting linkage connected between said drive gear and said second gear for transmitting the rotary motion of said motor shaft into an oscillating movement of said projection.

16. The invention as defined in claim 13 wherein said first and second portions are detachably connected together.

17. The invention as defined in claim 1 wherein said oscillating means includes an electric motor having a spindle and eccentric flywheel connected to the motor spindle.

References Cited

UNITED STATES PATENTS

| | | | |
|---|---|---|---|
| 2,263,219 | 11/1941 | Lybarger | 128—24.1 |
| 2,917,042 | 12/1959 | Brown et al. | 128—24 |
| 3,149,629 | 9/1964 | Katz | 128—44 |
| 3,363,623 | 1/1968 | Atwell | 128—36 |
| 3,375,381 | 3/1968 | Tavel | 128—36 XR |

FOREIGN PATENTS 18,636  6/1908  Norway.

L. W. TRAPP, Primary Examiner

U.S. Cl. X.R.

128—52, 79